United States Patent [19]

Uchiyama et al.

[11] Patent Number: 4,564,999

[45] Date of Patent: Jan. 21, 1986

[54] FILM HANDLING MECHANISM

[75] Inventors: Kaoru Uchiyama; Koji Ichikawa, both of Kanagawa, Japan

[73] Assignee: Fuji Photo Film Co., Ltd., Kanagawa, Japan

[21] Appl. No.: 625,757

[22] Filed: Jun. 28, 1984

[30] Foreign Application Priority Data

Jul. 29, 1983 [JP] Japan ............................... 58-139693

[51] Int. Cl.[4] ........................ B23P 19/04; B65H 75/02

[52] U.S. Cl. ...................................... 29/806; 29/426.3; 242/55; 354/319

[58] Field of Search ............................ 242/55, 67.1 R; 29/426.3, 426.6, 806; 206/409, 407, 397; 220/4 E, 4 B; 354/275, 319–322

[56] References Cited

U.S. PATENT DOCUMENTS 3,548,478 12/1970 Blackman ............................. 29/806
3,823,888 7/1974 Zagenfeind ........................... 242/55
3,883,054 5/1975 Butschek .......................... 242/55 X
3,921,278 11/1975 Basu ................................. 242/55 X

FOREIGN PATENT DOCUMENTS 155443 9/1982 Japan .

*Primary Examiner*—John M. Jillions
*Attorney, Agent, or Firm*—Sughrue, Mion, Zinn, Macpeak & Seas

[57] ABSTRACT

A film handling mechanism for receiving a film and spool ejected from a film cartridge and for forwarding the film to a subsequent film processing station. Film guide members are movable to form an opening having a diameter substantially equal to the inside diameter of the film receiver when a film is received in the receiver, and then set to a diameter suitable for holding the spool of the film after the film has been completely received in the film receiver. A pair of shafts is used for ejecting the film and spool from the film cartridge and transferring it into the film receiver.

6 Claims, 6 Drawing Figures

FILM HANDLING MECHANISM

BACKGROUND OF THE INVENTION

The present invention relates to film handling mechanisms, and more particularly to a film handling mechanism which can handle films which have been wound with the photosensitive surface on either the inside or outside of the wound film, and films which have been wound loosely as well as films which have been wound normally.

The present applicant has proposed a film handling mechanism, disclosed in Japanese Utility Model Application No. 155,443/1982, in which an exposed film is removed from its cartridge by pushing the spool while the latter is being rotated so that the film is wound tightly. However, this film handling mechanism suffers from a difficulty that it sometimes results in that it cannot tightly wind a film which has been wound inside out or loosely, resulting in the rolled film having a conical shape, which makes it impossible to further treat the film automatically.

In view of the foregoing, an object of the invention is to provide a film handling mechanism in which the above-described difficulties accompanying a conventional film handling mechanism have been eliminated and in which a film which has been wound inside out or extremely loosely can be handled as well as films which have been wound normally.

SUMMARY OF THE INVENTION

The foregoing object of the invention has been achieved by the provision of a film handling mechanism for receiving a film and a spool removed from a cartridge and forwarding the film to a succeeding film processing station, which, according to the invention, includes a film receiver for receiving a film removed from its film cartridge, film guide members provided on the film receiving opening side of the film receiver, the film guide members forming a film receiving opening whose diameter is substantially equal to the inside diameter of the film receiver when the film receiver is receiving a film and suitable for holding the spool of the film at one end after the film has been received by the film receiver, and means for holding the spool in association with the film guide members.

DESCRIPTION OF THE PREFERRED EMBODIMENTS

A preferred embodiment of a film handling mechanism of the present invention will be described with reference to the accompanying drawings.

Figure 1:
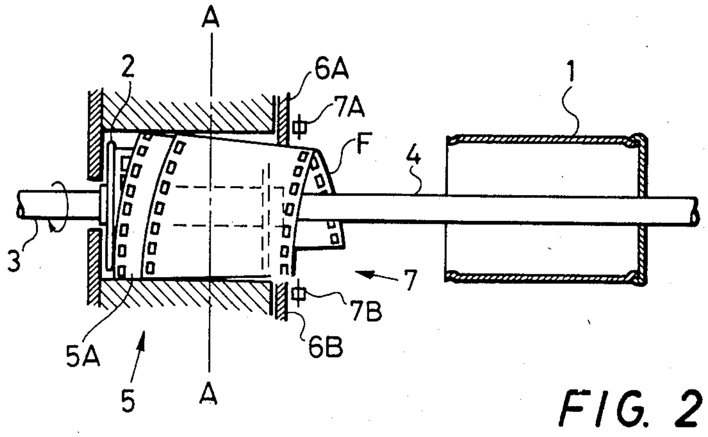
FIG. 1 is a front view showing essential components of an example of a film handling mechanism constructed according to this invention.
Figure 2:
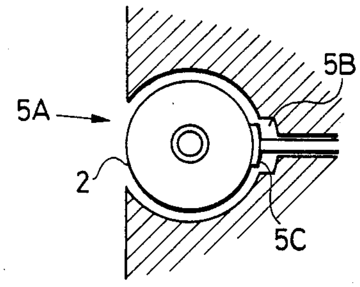
FIG. 2 is a sectional view taken along a line A—A in FIG. 1.

FIG. 1 is a front view showing essential components of a film handling mechanism of the invention. FIG. 2 is a sectional view taken along a line A—A in FIG. 1. FIG. 1 shows the film handling mechanism in the state in which it has received a film together with its spool from a cartridge, which has been disassembled. In FIGS. 1 and 2, reference numeral 1 designates the film cartridge which is held by a holding device (not shown); 2, the spool on which the film F is wound; 3, a rotary shaft for holding one end of the spool 2 and transmitting a rotational force to the spool 2; 4, a shaft for disassembling the film cartridge 1 to remove the film F therefrom, the shaft 4 being movable together with the rotary shaft 3; 5, a film receiver; 6A and 6B, film guide members which can be displaced as described later; and 7, a detector composed of a light-emitting unit 7A and a light-detecting unit 7B.

The film receiver 5, as shown in FIG. 1, has a first opening through which the rotary shaft 3 extends, a second opening through which the film is received, and a film receiving chamber 5A in which is received the spool 2 pushed out of the cartridge 1 together with the film F wound on the spool. The film receiver 5 further has a film retaining member 5C made of a material such as urethane rubber having a high frictional resistance. The film retaining member 5C is designed to retain the film which has been put in the film receiving chamber 5A and to be retracted into a recess formed in the film receiving chamber 5A.

Each of the film guide members 6A and 6B is made of a material such as stainless steel plate which does not have a tendency to be electrically charged and which will not damage the film F. The ends of the guide members 6A and 6B are chamfered to the extent that they will not damage the film F. The film guide members 6A and 6B are reciprocatable between a first position (FIG. 3) for guiding the film into the film receiving chamber 5A of the film receiver 5 and a second position (FIG. 4) for holding one end of the spool 2 when the film has been put into the film receiving chamber 5A. The movement of the film guide members 6A and 6B from the second position to the first position is effected by a solenoid (not shown), and the movement from the first position to the second position is effected by a spring (not shown).

The operation of the film handling mechanism thus constructed will be described.

Figure 3:
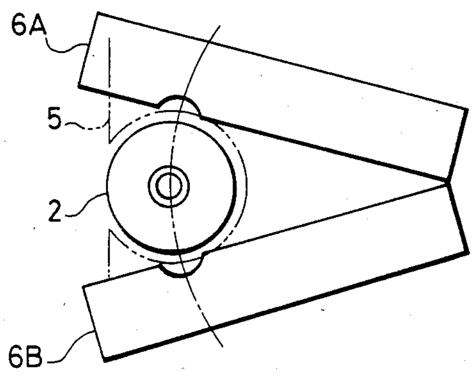
FIGS. 3 and 4 are side views showing film guide members in the film handling mechanism of the invention.
Figure 4:
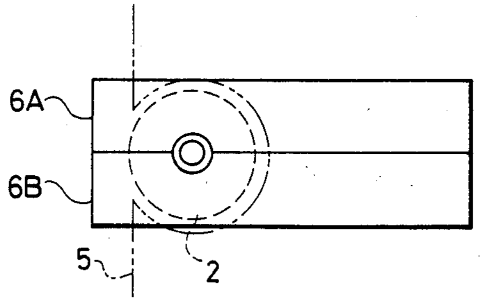

After a film cartridge containing a film F is set as shown in FIG. 1, the shaft 4 is moved to push the spool 2 out of the cartridge to disassemble the latter, as a result of which the spool 2 with the film wound thereon is moved towards the film receiver. At the same time, a detector (not shown) determines whether the film has been wound normally or inside out. According to the result of this determination, the rotary shaft 3 is made to rotate at a speed in a range of 500 to 1000 rpm to wind the film tightly. In this operation, the film guide members 6A and 6B are positioned as shown in FIG. 3 to guide the film F into the film receiving chamber 5A from the disassembled cartridge. This state is as shown in FIG. 1.

At this time instant, the film F is not completely positioned in the film receiving chamber 5A because the peripheral portion of the rolled film is still outside the film receiving chamber 5A. However, as the rotary shaft 3 turns, the peripheral portion of the film is gradually moved into the film receiving chamber 5A by the action of the film guide members 6A and 6B as described below.

Figure 5:
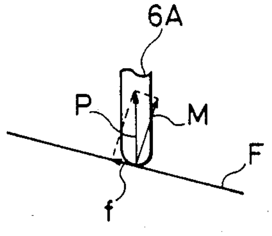
FIG. 5 is an explanatory diagram for a description of the action of the film guide members.
Figure 6:
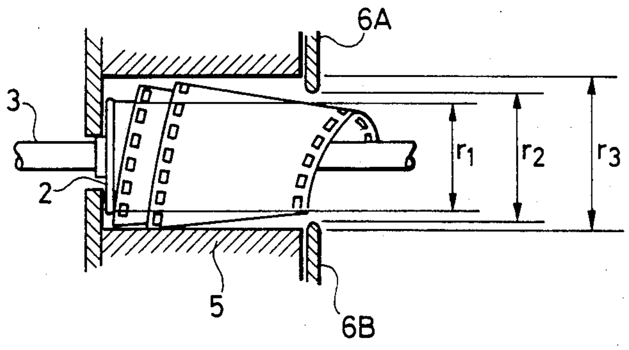
FIG. 6 is an explanatory diagram showing essential dimensions in FIG. 1.

FIG. 5 shows the actions of forces at the point where the end of the film guide member 6A contacts the film F. The film receiving chamber 5A is located on the lefthand side in the view of FIG. 5. In FIG. 5, reference character M designates a force of unwinding or loosening the film F; P, a force exerted on the film guide member 6A; and f, a force of moving the film F sidewardly to force the film F into the film receiving chamber 5A.

As is apparent from FIG. 5, when the film F is brought into contact with the end of the film guide member 6A, the force f is exerted on the film so that the film is moved into the film receiving chamber 5A. When the film F is at rest, a static frictional force, equal in magnitude to the force f, acts in the direction opposite to the direction of the force f, therefore maintaining the film F stationary. Accordingly, it is necessary to turn the film F suitably. As the film F is turned, the static frictional force is decreased, and the force f becomes larger than the static frictional force thus decreased.

The same phenomenon occurs with the end of the film guide member 6B. Thus, the conically wound film is corrected into a normally wound film. For the film handling mechanism, it is necessary that the inside diameter $r_2$ defined by the ends of the film guide members 6A and 6B be smaller than the inside diameter $r_3$ of the film receiver 5 and larger than the outside diameter $r_1$ of the spool 2.

When the peripheral portion of the film F has been put into the film receiving chamber 5A, that is, when the film F has been completely received in the film receiving chamber 5A, the detector 7 detects the reception of the peripheral portion of the film F in the film receiving chamber 5A and produces an output signal which is applied to deenergize the solenoid which has maintained the film guide members 6A and 6B open. As a result, the film guide members 6A and 6B are closed by the force of the spring, thus holding the end of the spool 2. Therefore, the following operations can be positively carried out.

When the film F has been rolled up, the film retaining member 5C held retracted into the recess 5B of the film receiver 5 is extended to retain the peripheral portion of the film F, whereby the film F is more positively wound tightly. The film F thus wound up is forwarded to the following processing station beginning at its peripheral portion.

In the above-described embodiment, the film guide members 6A and 6B are made of stainless steel. However, it goes without saying that they may be made of metal or a compound material of high electrical conductivity. Furthermore, in the described embodiment, the mechanism used for driving the guide members 6A and 6B is composed of the solenoid and the spring. However, it is apparent that other driving mechanisms may be employed.

In addition, in the described embodiment, the detector 7 used for detecting when the film F has been completely received by the film receiver 5 is provided outside the film guide members 6A and 6B. On the other hand, it may be mounted on the film guide members 6A and 6B.

As is apparent from the above description, the film handling mechanism for receiving a film and a spool removed from its film cartridge and forwarding the film to the following processing station, according to the invention, includes the film receiver for receiving a film taken out of the cartridge, the film guide members provided on the film receiving opening side of the film receiver, the film guide members forming the film receiving opening whose diameter is substantially equal to the inside diameter of the film receiver when it receives a film and suitable for holding one end of the spool after the film has been received by the film receiver, and the device for holding the spool in association with the film guide members. This film handling mechanism of the invention can handle films which have been wound inside out or films which have been wound extremely loosely, as well as films which have been normally wound.

We claim:

1. A film handling mechanism for receiving a film and a spool removed from a cartridge and forwarding said film to a following film processing station, comprising:
   - a film receiver for receiving said film removed from said film cartridge, said film receiver having first and second sides and receiving said film from said first side thereof, said film receiver having an inside diameter;
   - film guide members provided on said first side of said film receiver and movable between a first position in which said film guide members form a film receiving opening having a diameter substantially equal to said inside diameter of said film receiver when said film receiver is receiving a film and a second position for holding said spool of said film at one end after said film has been received by said film receiver; and
   - means for moving said film guide members between said first and second positions.

2. The film handling mechanism of claim 1, further comprising a pair of shafts, engageable with ends of said spool, for extracting said film from said cartridge and transferring said film from said cartridge to said film receiver.

3. The film handling mechanism of claim 2, further comprising a film retaining member, said film retaining member being slidable into contact with a surface of said film when said film has been completely received in said film receiver.

4. The film handling mechanism of claim 3, wherein said film retaining member comprises a member made of a material having a large frictional resistance attached to an end of a slidable rod and retractable into a recess formed in said film receiver.

5. The film handling mechanism of claim 4, wherein said material of said film retaining member is a material having a large frictional resistance.

6. The film handling mechanism of claim 5, wherein said material comprises urethane rubber.

* * * * *